United States Patent
Lecue et al.

(10) Patent No.: US 10,565,475 B2
(45) Date of Patent: Feb. 18, 2020

(54) GENERATING A MACHINE LEARNING MODEL FOR OBJECTS BASED ON AUGMENTING THE OBJECTS WITH PHYSICAL PROPERTIES

(71) Applicant: Accenture Global Solutions Limited, Dublin (IE)

(72) Inventors: Freddy Lecue, Dublin (IE); Victor Oliveira Antonino, Dublin (IE); Sofian Hamiti, Dublin (IE); Gaurav Kaila, Dublin (IE)

(73) Assignee: Accenture Global Solutions Limited, Dublin (IE)

( * ) Notice: Subject to any disclaimer, the term of this patent is extended or adjusted under 35 U.S.C. 154(b) by 141 days.

(21) Appl. No.: 15/961,392

(22) Filed: Apr. 24, 2018

(65) Prior Publication Data

US 2019/0325265 A1  Oct. 24, 2019

(51) Int. Cl.
*G06K 9/62* (2006.01)
*G06K 9/00* (2006.01)
(Continued)

(52) U.S. Cl.
CPC ....... *G06K 9/6256* (2013.01); *G06K 9/00718* (2013.01); *G06K 9/6262* (2013.01); *G06N 3/0454* (2013.01); *G06N 3/08* (2013.01)

(58) Field of Classification Search
CPC ........ G06N 20/00; G06N 3/08; G06N 3/0454; G06N 3/084; G06N 3/088; G06K 9/6262;
(Continued)

(56) References Cited

U.S. PATENT DOCUMENTS 5,408,424 A * 4/1995 Lo ................... H03H 17/0255
   708/303
10,223,614 B1 * 3/2019 Kim ................... G06K 9/6262
(Continued)

FOREIGN PATENT DOCUMENTS

WO   WO 2019053052 A1 * 3/2019 ............... G09B 9/00

OTHER PUBLICATIONS

Antoniou A., et al., "Data Augmentation Generative Adversarial Networks", arxiv.org, Cornell University Library, United States, Nov. 12, 2017, XP081310756.
(Continued)

*Primary Examiner* — Jingge Wu
(74) *Attorney, Agent, or Firm* — Harrity & Harrity, LLP

(57) ABSTRACT

A device receives images of a video stream, models for objects in the images, and physical property data for the objects, and maps the models and the physical property data to the objects in the images to generate augmented data sequences. The device applies different physical properties to the objects in the augmented data sequences to generate augmented data sequences with different applied physical properties, and trains a machine learning (ML) model based on the images to generate a first trained ML model. The device trains the ML model, based on the augmented data sequences with the different applied physical properties, to generate a second trained ML model, and compares the first trained ML model and the second trained ML model. The device determines whether the second trained ML model is optimized based on the comparison, and provides the second trained ML model when optimized.

20 Claims, 10 Drawing Sheets

(51) Int. Cl.
*G06N 3/04* (2006.01)
*G06N 3/08* (2006.01)

(58) Field of Classification Search
CPC ............ G06K 9/6256; G06K 2209/27; G06K 9/00718; H04N 13/344; H04N 1/387; H04N 21/23418; H04N 21/23439; H04N 21/23655; H04N 21/8456; H04N 5/23222; H04N 5/2353; H04N 5/2354; H04N 5/2628; H04N 7/18
See application file for complete search history.

(56) References Cited

U.S. PATENT DOCUMENTS

| | | | | |
|---|---|---|---|---|
| 10,289,903 | B1* | 5/2019 | Chandler | G06K 9/00355 |
| 2011/0228976 | A1* | 9/2011 | Fitzgibbon | G06K 9/00335 |
| | | | | 382/103 |
| 2017/0132528 | A1* | 5/2017 | Aslan | G06N 20/00 |
| 2018/0129911 | A1* | 5/2018 | Madabhushi | G06K 9/4628 |
| 2018/0129972 | A1* | 5/2018 | Chen | G06N 3/063 |
| 2018/0247156 | A1* | 8/2018 | Holtham | G06K 9/6215 |
| 2018/0247195 | A1* | 8/2018 | Kumar | G06N 3/08 |
| 2018/0276560 | A1* | 9/2018 | Hu | G06N 20/00 |
| 2018/0341872 | A1* | 11/2018 | Wang | G06N 3/0454 |
| 2018/0349527 | A1* | 12/2018 | Li | G06N 3/0445 |
| 2018/0374105 | A1* | 12/2018 | Azout | G06N 20/00 |
| 2019/0095946 | A1* | 3/2019 | Azout | G06N 20/00 |
| 2019/0122120 | A1* | 4/2019 | Wu | G06N 3/088 |
| 2019/0130218 | A1* | 5/2019 | Albright | G06K 9/6256 |
| 2019/0130230 | A1* | 5/2019 | Kang | G06K 9/66 |
| 2019/0130232 | A1* | 5/2019 | Kaasila | G06N 20/00 |
| 2019/0188566 | A1* | 6/2019 | Schuster | G06N 3/08 |
| 2019/0209116 | A1* | 7/2019 | Sjostrand | A61B 6/037 |
| 2019/0236482 | A1* | 8/2019 | Desjardins | G06N 3/08 |
| 2019/0258901 | A1* | 8/2019 | Albright | G06K 9/00664 |
| 2019/0294922 | A1* | 9/2019 | Clark | G06K 9/6254 |
| 2019/0303760 | A1* | 10/2019 | Kumar | G06N 3/08 |
| 2019/0325259 | A1* | 10/2019 | Murphy | G06K 9/6259 |
| 2019/0325308 | A1* | 10/2019 | Chung | G06N 3/08 |

OTHER PUBLICATIONS

Extended European Search Report for Application No. EP19160456.0, dated Sep. 20, 2019, 12 pages.
Lemley J., et al., "Smart Augmentation—Learning an Optimal Data Augmentation Strategy", arxiv.org, Cornell University Library, United States, Mar. 24, 2017, XP080957611.
Perez L., et al., "The Effectiveness of Data Augmentation in Image Classification Using Deep Learning", arxiv.org, Cornell University Library, United States, Dec. 13, 2017, XP080843267.
Ratner A.J., et al., "Learning to Compose Domain-Specific Transformations for Data Augmentation", arxiv.org, Cornell University Library, United States, Sep. 6, 2017, XP081400970.
Sixt L., et al., "RenderGAN: Generating Realistic Labeled Data", Jan. 2, 2017, XP055472473, [Retrieved on May 3, 2018] Retrieved from the Internet [URL: https://arxiv.org/pdf/1611.01331.pdf].

* cited by examiner

GENERATING A MACHINE LEARNING MODEL FOR OBJECTS BASED ON AUGMENTING THE OBJECTS WITH PHYSICAL PROPERTIES

BACKGROUND

Artificial intelligence describes different ways that a machine interacts with a world around it. Through advanced, human-like intelligence (e.g., provided by software and hardware), an artificial intelligence model can mimic human behavior or perform tasks as if the artificial intelligence model were human. Machine learning is an approach, or a subset, of artificial intelligence, with an emphasis on learning rather than just computer programming. In machine learning, a device utilizes complex models to analyze a massive amount of data, recognize patterns among the data, and make a prediction without requiring a person to program specific instructions. Machine learning techniques require a massive amount of data to compute robust and scalable models (e.g., models used for classification, regression, related prediction tasks, and/or the like).

SUMMARY

According to some implementations, a device may include one or more memories, and one or more processors, communicatively coupled to the one or more memories, to receive images of a video stream, three-dimensional models for objects in the images, and physical property data for the objects, and map the three-dimensional models and the physical property data to the objects in the images to generate augmented data sequences with the objects. The one or more processors may apply different physical properties, of the physical property data, to the objects in the augmented data sequences, based on an augmentation policy, to generate augmented data sequences with different applied physical properties, and may train a machine learning model based on the images of the video stream to generate a first trained machine learning model. The one or more processors may train the machine learning model, based on the augmented data sequences with the different applied physical properties, to generate a second trained machine learning model, and may compare the first trained machine learning model and the second trained machine learning model. The one or more processors may determine whether the second trained machine learning model is optimized based on a result of comparing the first trained machine learning model and the second trained machine learning model, and may provide the second trained machine learning model and the different applied physical properties when the second trained machine learning model is optimized.

According to some implementations, a non-transitory computer-readable medium may store instructions that include one or more instructions that, when executed by one or more processors, cause the one or more processors to receive images of a video stream, three-dimensional models for objects in the images, and physical property data for the objects. The images of the video stream may include metadata that identifies the images of the video stream, the objects in the images, classes associated with the objects, boundary boxes for the images, coordinates associated with the objects in the images, and/or names of the objects. The three-dimensional models may include three-dimensional representations of the objects, three-dimensional coordinates associated with the objects, normal vectors associated with the objects, and/or the names of the objects. The physical property data may include the names of the objects, information associated with deformations of the objects, information associated with gravities for the objects, information associated with rotations of the objects, information associated with renderings of the objects, and/or information associated with collisions of the objects. The one or more instructions may cause the one or more processors to map the three-dimensional models and the physical property data to the objects in the images to generate augmented data sequences with the objects, and apply different physical properties, of the physical property data, to the objects in the augmented data sequences to generate augmented data sequences with different applied physical properties. The one or more instructions may cause the one or more processors to train a machine learning model based on the images of the video stream to generate a first machine learning model, and train the machine learning model, based on the augmented data sequences with the different applied physical properties, to generate a second machine learning model. The one or more instructions may cause the one or more processors to test the first machine learning model and the second machine learning model to generate first test results and second test results, respectively, and determine whether the second machine learning model is optimized based on comparing the first test results and the second test results. The one or more instructions may cause the one or more processors to utilize the second machine learning model and the different applied physical properties, when the second machine learning model is optimized, to make a prediction.

According to some implementations, a method may include receiving, by a device, images of a video stream, three-dimensional models for objects in the images, and physical property data for the objects, and associating, by the device, the three-dimensional models and the physical property data with the objects in the images to generate augmented data sequences with the objects. The method may include receiving, by the device, an augmentation policy, and applying, by the device and based on an augmentation policy, different physical properties, of the physical property data, to the objects in the augmented data sequences in order to generate augmented data sequences with different applied physical properties. The method may include training, by the device, a machine learning model based on the images of the video stream to generate a first trained machine learning model, and training, by the device, the machine learning model, based on the augmented data sequences with the different applied physical properties, to generate a second trained machine learning model. The method may include testing, by the device, the first trained machine learning model and the second trained machine learning model to generate first test results and second test results, respectively, and determining, by the device, whether the second trained machine learning model is optimized based on whether the second test results are within a predetermined threshold of the first test results. The method may include providing, by the device, the second trained machine learning model and the different applied physical properties when the second trained machine learning model is optimized.

DETAILED DESCRIPTION

The following detailed description of example implementations refers to the accompanying drawings. The same reference numbers in different drawings may identify the same or similar elements.

Existing machine learning techniques handle limited training data situations by generating and/or bootstrapping additional data from an initial training data set (e.g., provided as an input). However, the additional data adds noise to the limited training data. For example, for training data that includes videos, video frames, and/or images, the additional data may include applying modification techniques (e.g., a rotation technique, a sliding technique, and/or the like) to the objects of the videos, the video frames, and/or the images. Unfortunately, such modification techniques add noise to the training data by artificially and unrealistically modifying the objects.

Some implementations described herein provide an embedding platform that generates a machine learning model for objects based on augmenting the objects with physical properties. For example, the embedding platform may receive images of a video stream, three-dimensional (3D) models for objects in the images, and physical property data for the objects, and may map the 3D models and the physical property data to the objects to generate augmented data sequences. The embedding platform may apply different physical properties, of the property data, to the objects in the augmented data sequences, based on an augmentation policy, to generate augmented data sequences with different applied physical properties. The embedding platform may train a machine learning model based on the images of the video stream to generate a first machine learning model, and may train the machine learning model based on the augmented data sequences with the different applied physical properties to generate a second machine learning model. The embedding platform may test the first machine learning model to generate first machine learning model test results, and may test the second machine learning model to generate second machine learning model test results. The embedding platform may determine whether the second machine learning model is optimized based on comparing the first machine learning model test results and the second machine learning model test results. The embedding platform may utilize the second machine learning model and the different applied physical properties when the second machine learning model is optimized.

Figure 1A:
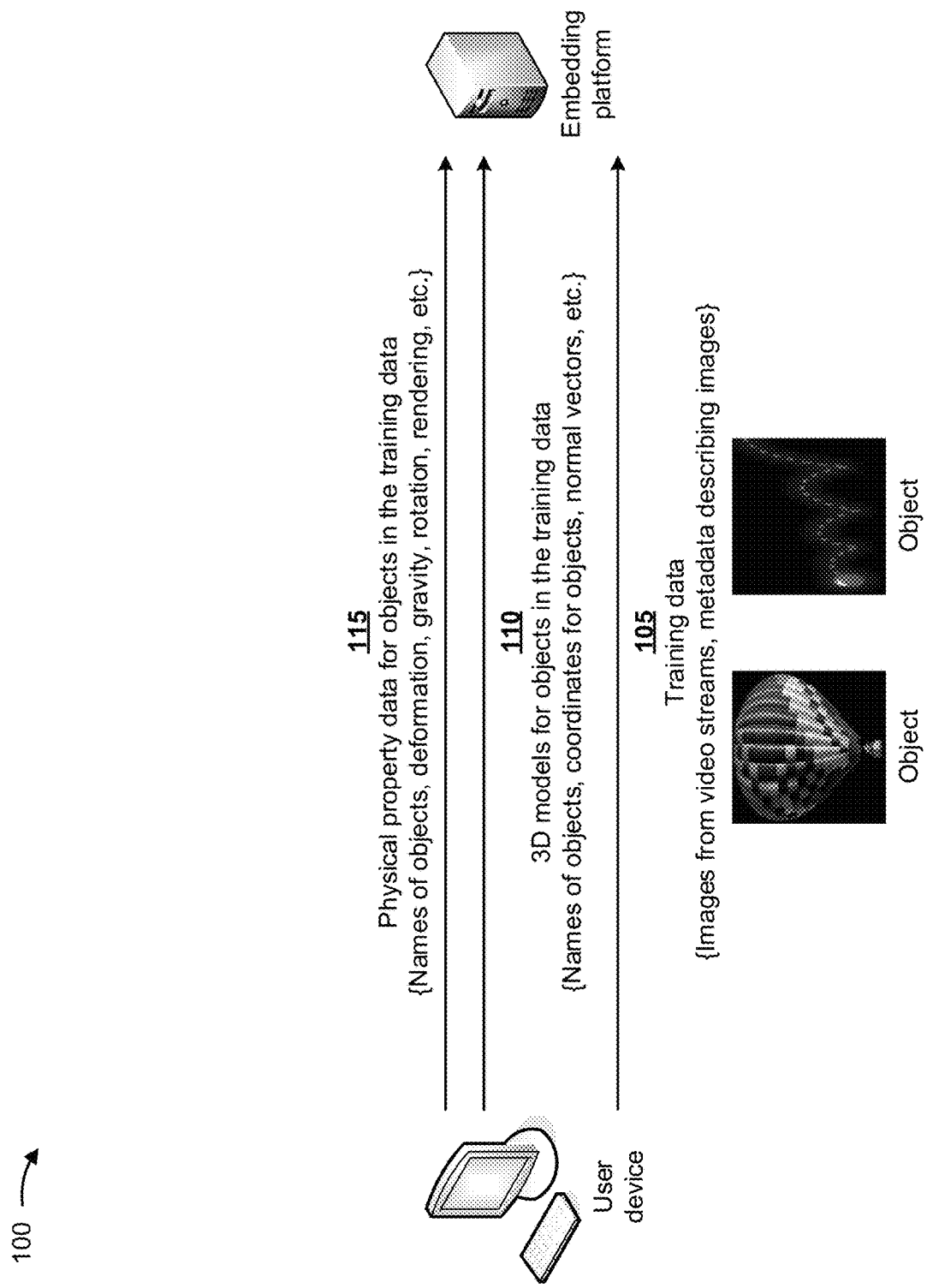
FIGS. 1A-1G are diagrams of an overview of an example implementation described herein.

FIGS. 1A-1G are diagrams of an overview of an example implementation 100 described herein. As shown in FIG. 1A, a user device may be associated with an embedding platform. As shown in FIG. 1A, and by reference number 105, a user of the user device (e.g., via a user interface provided to the user) may cause the user device to provide, to the embedding platform, training data for a machine learning model (e.g., images from video streams, metadata describing the images, and/or the like). In some implementations, the images may include objects, such as, as shown in FIG. 1A, a hot air balloon, a bouncing ball, and/or the like. As further shown in FIG. 1A, and by reference number 110, the user may cause the user device to provide, to the embedding platform, 3D models for objects in the images of the training data (e.g., names of the objects, coordinates for the objects, normal vectors for the objects, and/or the like). As further shown in FIG. 1A, and by reference number 115, the user may cause the user device to provide, to the embedding platform, physical property data for the objects in the images of the training data (e.g., names of the objects, deformation data for the objects, gravity data for the objects, rotation data for the objects, rendering data for the objects, and/or the like).

In some implementations, the training data, the 3D models, and/or the physical property data may not be stored in the user device, but the user device may cause the training data, the 3D models, and/or the physical property data to be provided from one or more resources, storing the training data, the 3D models, and/or the physical property data, to the embedding platform. In some implementations, the embedding platform may receive the training data, the 3D models, and/or the physical property data, and may store the training data, the 3D models, and/or the physical property data in a memory associated with the embedding platform.

Figure 1B:
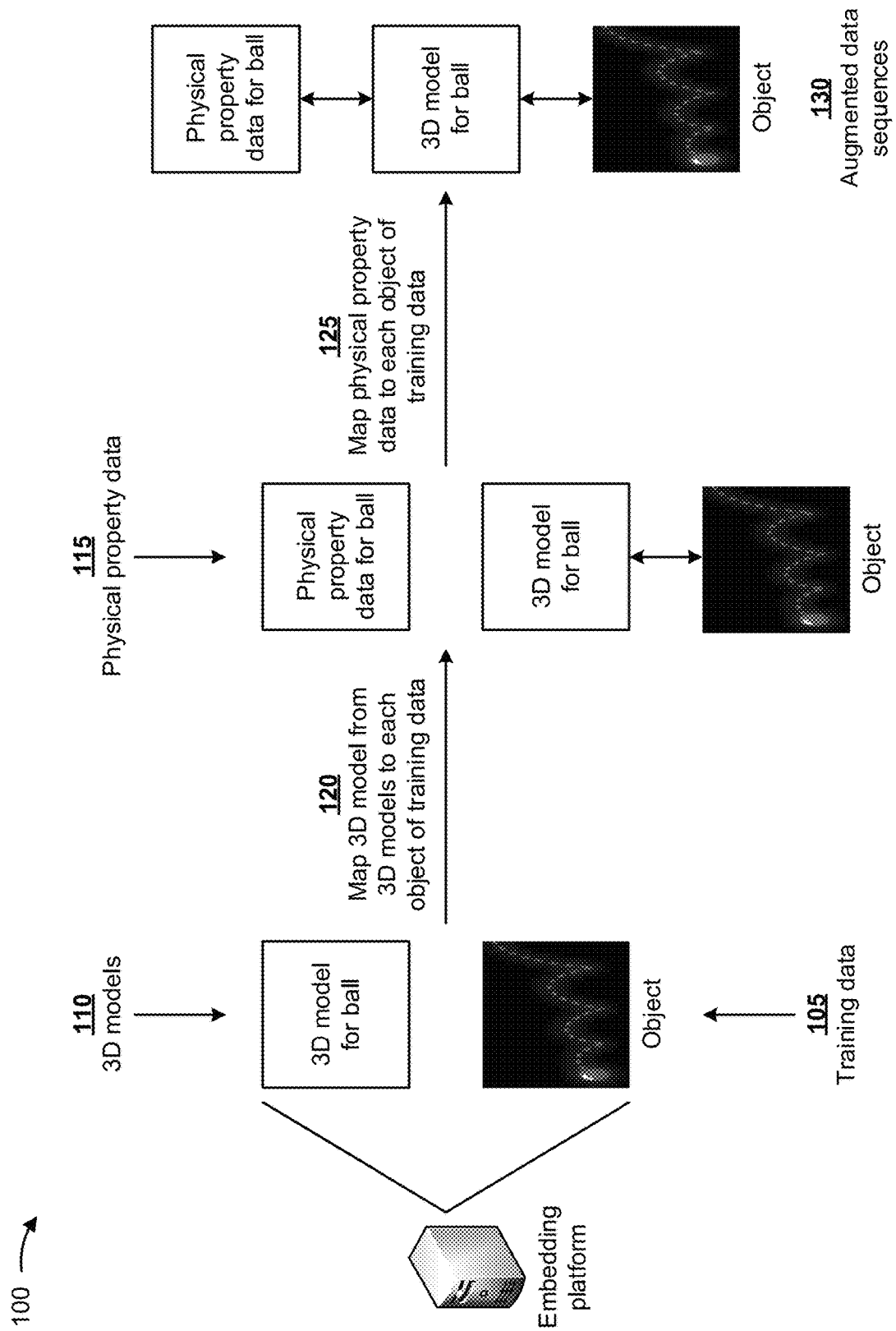

As shown in FIG. 1B, and by reference numbers 105, 110, and 120, the embedding platform may map a 3D model, of the 3D models, to each corresponding object in the images of the training data. For example, if the training data includes a bouncing ball as an object, the embedding platform may map a 3D model for a bouncing ball to the object of the bouncing ball. In some implementations, the embedding platform may utilize a data mapping technique to map a 3D model, of the 3D models, to an object in the images of the training data, as described elsewhere herein. In some implementations, the embedding platform may utilize a nonlinear data mapping technique, which utilizes neural networks, to map a 3D model, of the 3D models, to an object in the images of the training data, as described elsewhere herein.

As further shown in FIG. 1B, and by reference numbers 115 and 125, the embedding platform may map physical property data to each corresponding object in the images of the training data. In some implementations, the embedding platform may utilize a data mapping technique to map physical property data to each object in the images of the training data, as described elsewhere herein. In some implementations, the embedding platform may utilize a nonlinear data mapping technique, which utilizes neural networks, to map physical property data to each object in the images of the training data, as described elsewhere herein. As further shown in FIG. 1B, and by reference number 130, each mapped object, 3D model, and physical property data may generate what is referred to herein as an augmented data sequence (e.g., the object that is augmented by the corresponding 3D model and the corresponding physical property data).

Figure 1C:
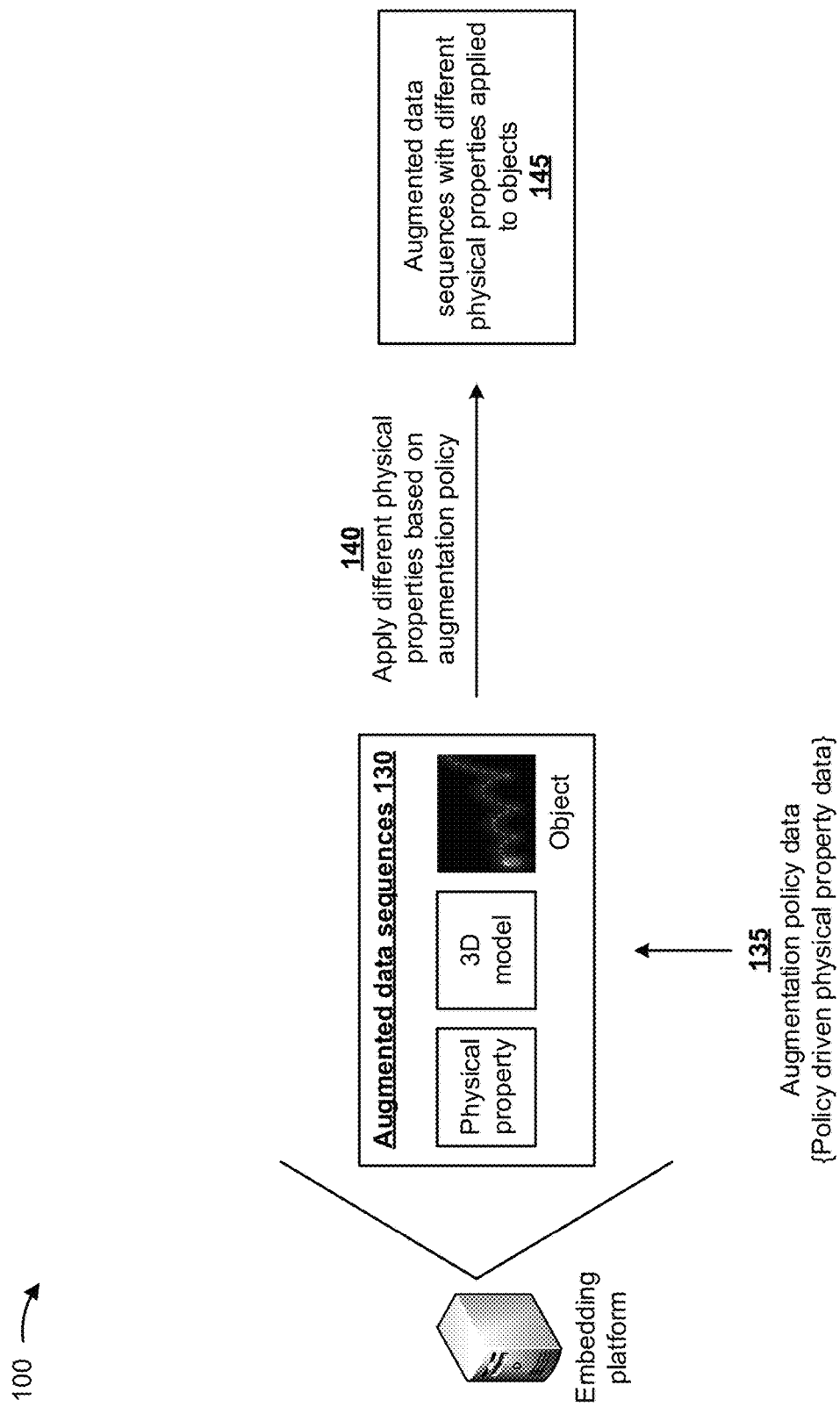

As shown in FIG. 1C, and by reference numbers 130, 135, and 140, the embedding platform may apply different physical properties, of the physical property data, to objects in the augmented data sequences based on augmentation policy data associated with an augmentation policy. In some implementations, the augmentation policy data may include policy driven physical properties that are to be applied to the objects in the augmented data sequences. As further shown in FIG. 1C, and by reference number 145, applying the different physical properties to the objects in the augmented data sequences may generate augmented data sequences with different physical properties applied to the objects.

Figure 1D:
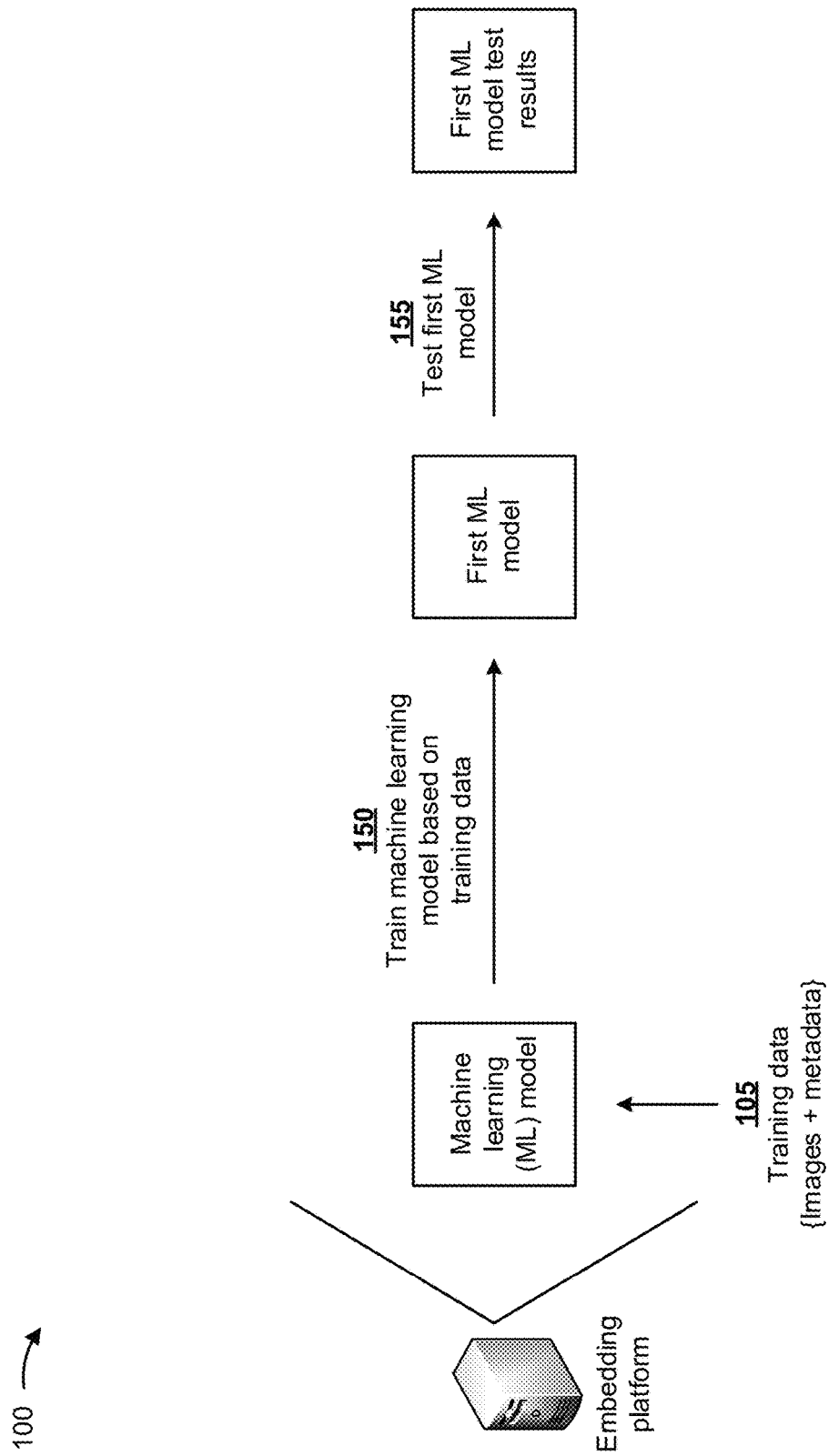

As shown in FIG. 1D, and by reference numbers 105 and 150, the embedding platform may train a machine learning model based on the training data to generate a first machine learning model (e.g., a first trained machine learning model). In some implementations, the first machine learning model may include an object detection deep learning model, such as a single shot multibox detector (SSD) model, a region-based fully convolutional network (R-FCN) model, a region-based convolution network (R-CNN) model, a fast R-CNN model, a faster R-CNN model, and/or the like, as described elsewhere herein.

As further shown in FIG. 1D, and by reference number 155, the embedding platform may test the first machine learning model (e.g., with test data that includes known results) to generate first machine learning model test results. In some implementations, the embedding platform may test the first machine learning model by receiving predictions (e.g., indicating what objects are provided in the training data) based on providing the training data to the machine learning model, and comparing the predictions to the known objects in the training data. In some implementations, the first machine learning model test results may provide an indication of whether the predictions are correct.

Figure 1E:
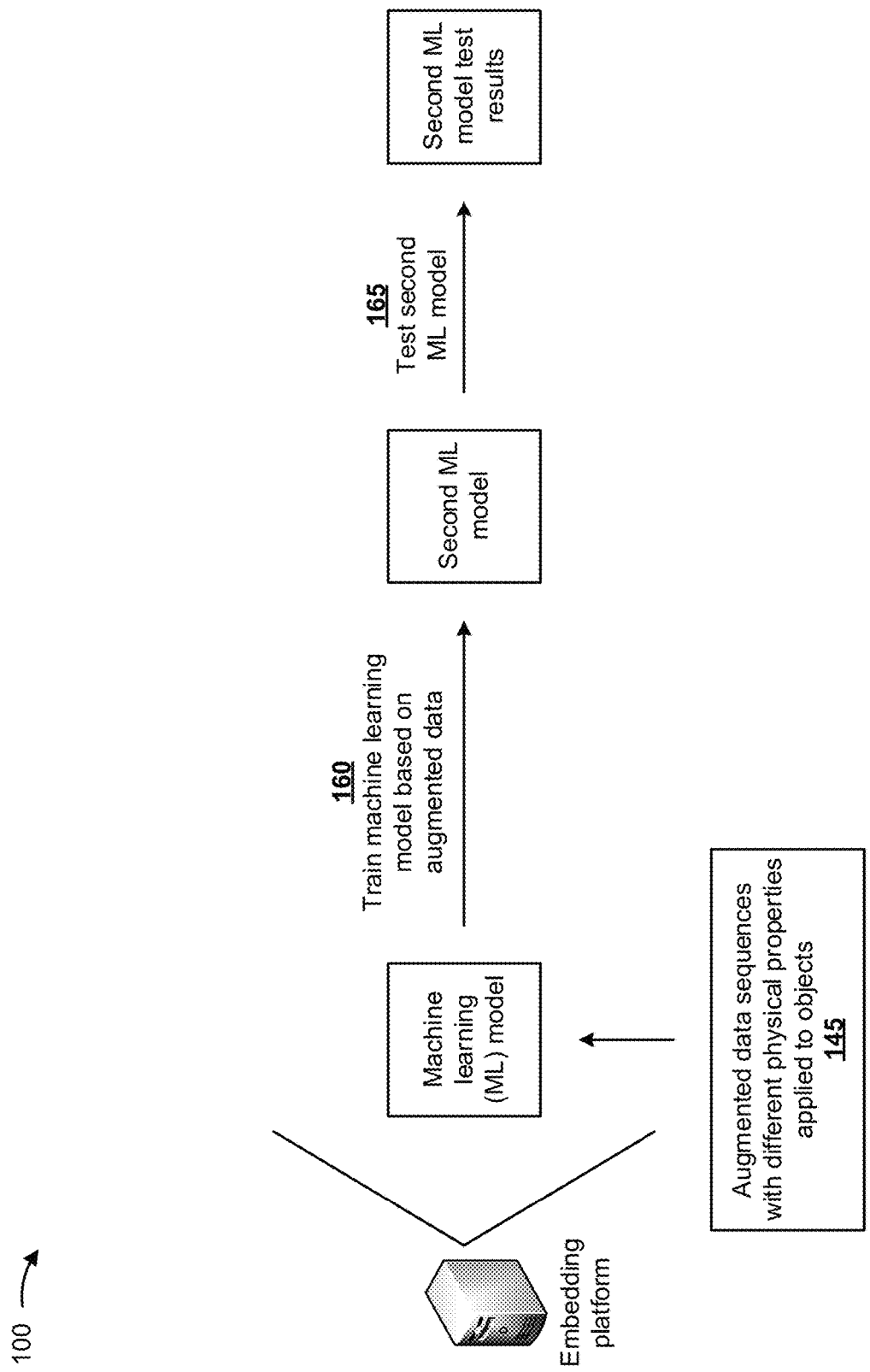

As shown in FIG. 1E, and by reference numbers 145 and 160, the embedding platform may train the machine learning model, based on the augmented data sequences with the different physical properties applied to the objects, to generate a second machine learning model (e.g., a second trained machine learning model). In some implementations, the second machine learning model may include an object detection deep learning model, such as a SSD model, a R-FCN model, a R-CNN model, a fast R-CNN model, a faster R-CNN model, and/or the like, as described elsewhere herein.

As further shown in FIG. 1E, and by reference number 165, the embedding platform may test the second machine learning model (e.g., with test data that includes known results) to generate second machine learning model test results. In some implementations, the embedding platform may test the second machine learning model by receiving predictions (e.g., indicating what objects are provided in the augmented data sequences with the different physical properties applied to the objects) based on providing the augmented data sequences, with the different physical properties applied to the objects, to the machine learning model, and comparing the predictions to the known objects in the augmented data sequences with the different physical properties applied to the objects. In some implementations, the second machine learning model test results may provide an indication of whether the predictions are correct.

Figure 1F:
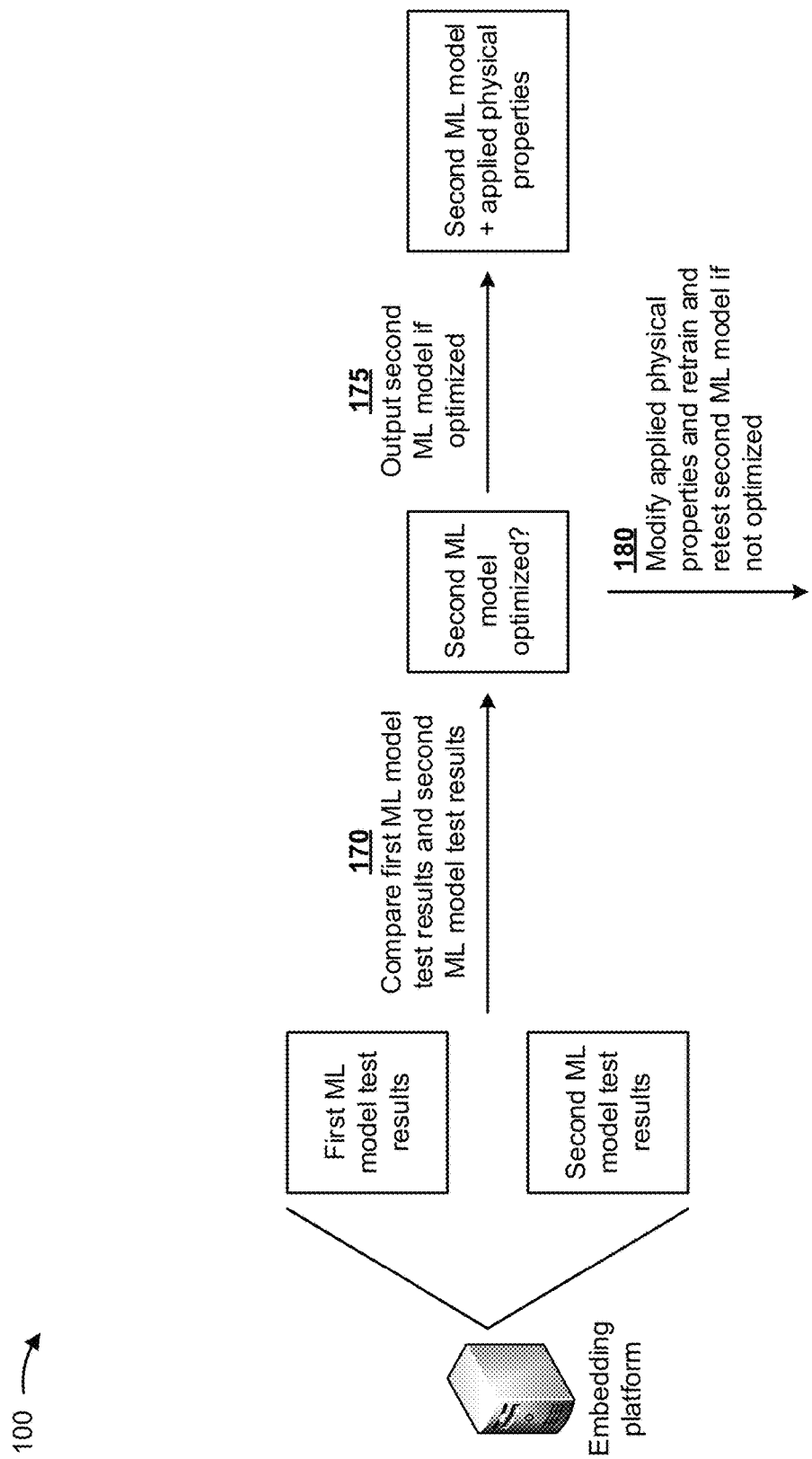

As shown in FIG. 1F, and by reference number 170, the embedding platform may compare the first machine learning model test results and the second machine learning model test results, and may determine whether the second machine learning model is optimized based on comparing the first machine learning model test results and the second machine learning model test results. In some implementations, the embedding platform may determine that the second machine learning model is optimized when the second machine learning model test results are within a predetermined threshold of the first machine learning model test results.

As further shown in FIG. 1F, and by reference number 175, if the embedding platform determines that the second machine learning model is optimized, the embedding platform may output the second machine learning model and the different physical properties applied to the objects.

As further shown in FIG. 1F, and by reference number 180, if the embedding platform determines that the second machine learning model is not optimized, the embedding platform may modify the different physical properties applied to the objects, and may retrain and retest the second machine learning model based on the modified different physical properties applied to the objects.

Figure 1G:
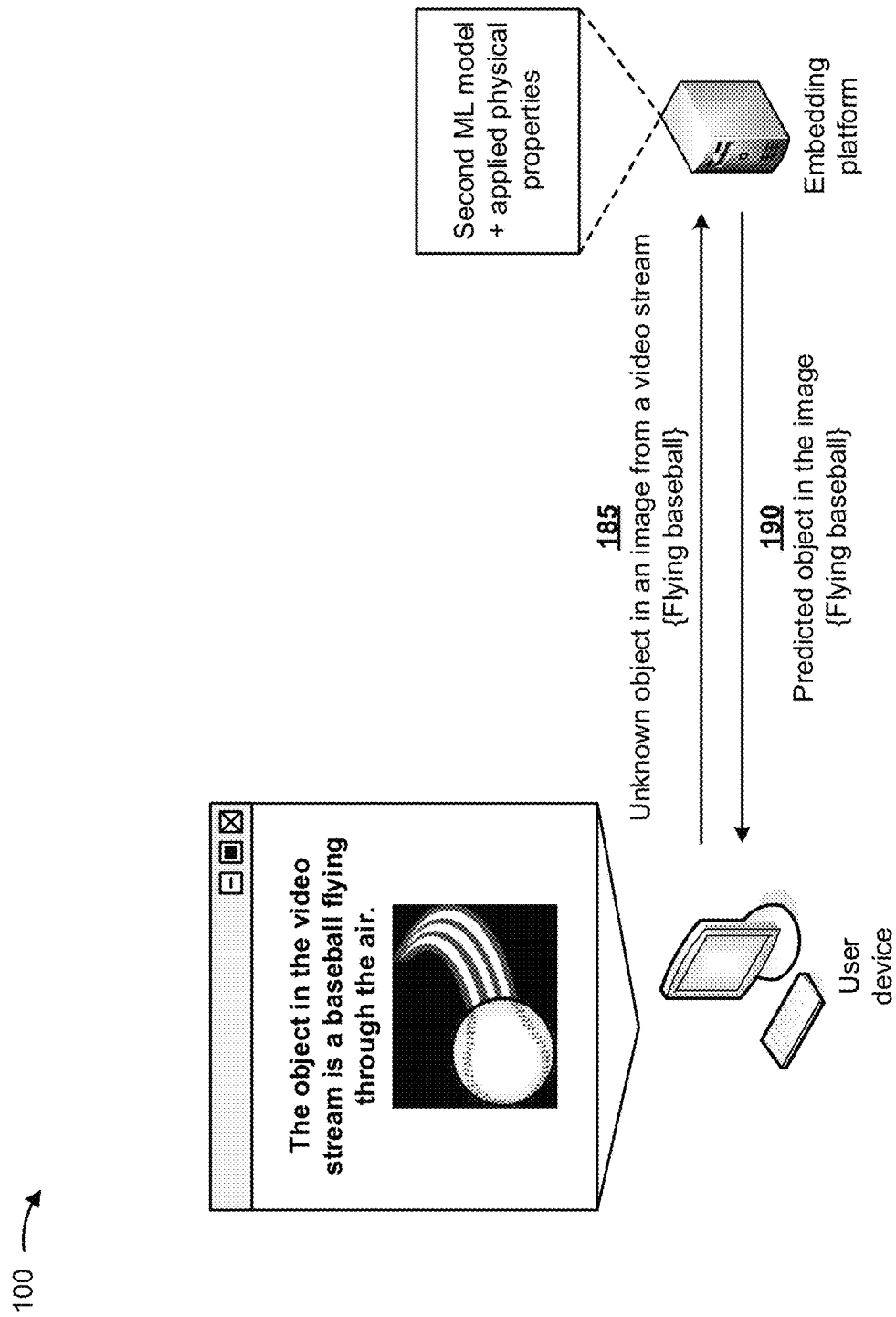

As shown in FIG. 1G, and by reference number 185, the user of the user device may cause the user device to provide, to the embedding platform, an unknown object in an image from a video stream. In some implementations, the embedding platform may receive the unknown object, and may utilize the second machine learning model, and the different physical properties applied to the objects, to predict the unknown object. For example, the embedding platform may predict that the unknown object is a baseball flying through the air. As further shown in FIG. 1G, and by reference number 190, the embedding platform may provide, to the user device, information indicating that the unknown object is a baseball flying though the air, and the user device may display the information indicating that the unknown object is a baseball flying though the air to the user of the user device (e.g., via a user interface).

In this way, several different stages of the process for generating a machine learning model for objects based on augmenting the objects with physical properties are automated, which may remove human subjectivity and waste from the process, and which may improve speed and efficiency of the process and conserve computing resources (e.g., processor resources, memory resources, and/or the like). Furthermore, implementations described herein use a rigorous, computerized process to perform tasks or roles that were not previously performed or were previously performed using subjective human intuition or input. These roles may include generating additional data from an initial training data set, bootstrapping additional data from an initial training data set, and/or the like. Finally, automating the process for generating a machine learning model for objects based on augmenting the objects with physical properties conserves computing resources (e.g., processor resources, memory resources, and/or the like) that would otherwise be wasted in attempting to generate the machine learning model.

Furthermore, in this way, implementations described herein address the problem of augmenting videos, video frames, and/or images by using realistic physics-based properties of objects in the videos, the video frames, and/or the images. Implementations described herein augment an initial training data set with realistic inputs for a machine learning model, resulting in more scalable and applicable machine learning models across different domains. Finally, implementations described herein compute the most appropriate and optimal physical properties to be applied to any object in the videos, the video frames, and/or the images, and outperform existing machine learning techniques, for handling limited training data situations, in terms of accuracy, precision, and recall.

As indicated above, FIGS. 1A-1G are provided merely as examples. Other examples are possible and may differ from what was described with regard to FIGS. 1A-1G. For example, although FIGS. 1A-1G described the embedding platform being used with image-related information, in some implementations, the embedding platform may be utilized with other types of information that may benefit from automating the process for generating a machine learning model for objects based on augmenting the objects with physical properties.

Figure 2:
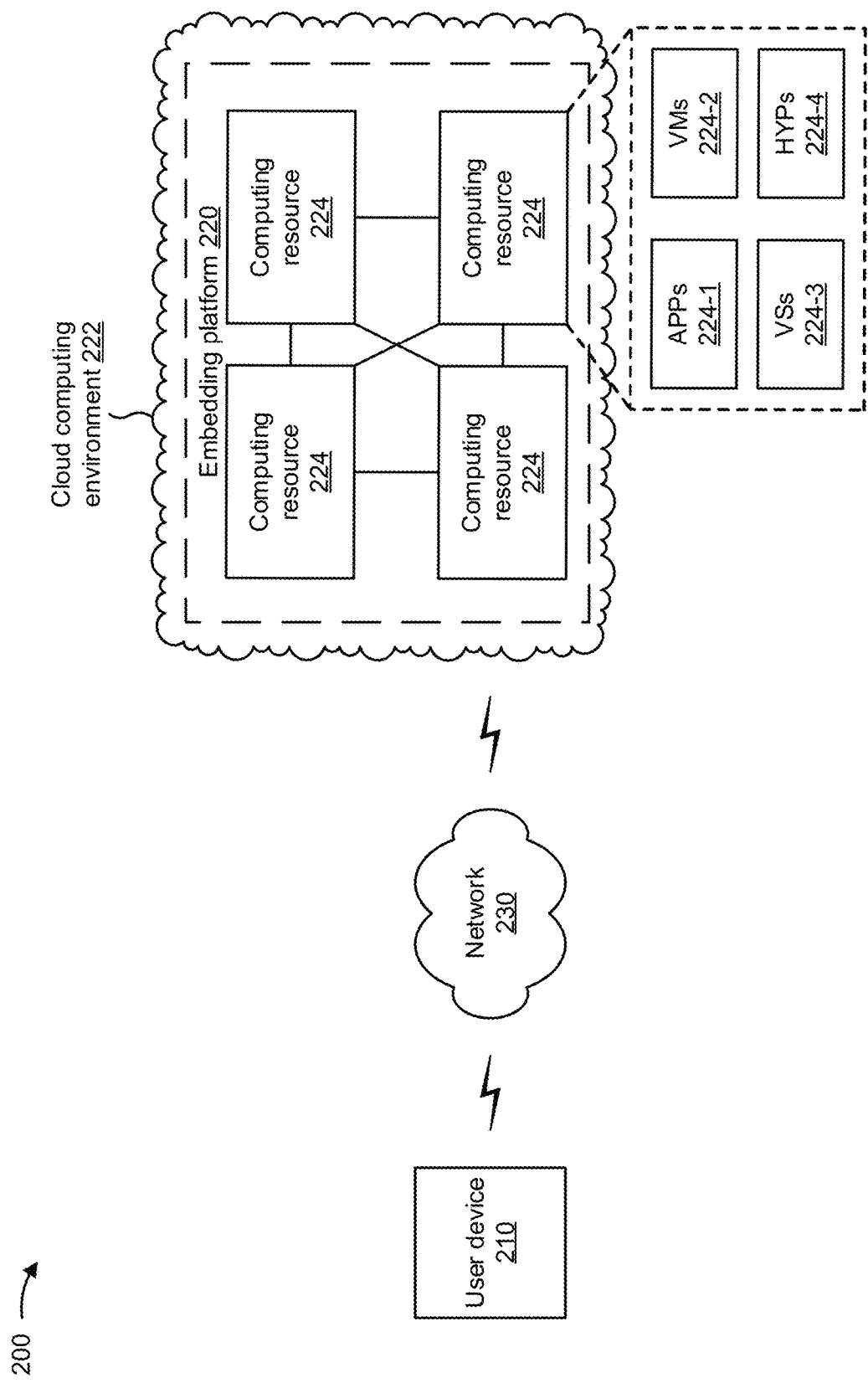
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, an embedding platform 220, and a network 230. Devices of environment 200 may interconnect via wired connections, wireless connections, or a combination of wired and wireless connections.

User device 210 includes one or more devices capable of receiving, generating, storing, processing, and/or providing information, such as information described herein. For example, user device 210 may include a mobile phone (e.g., a smart phone, a radiotelephone, etc.), a laptop computer, a tablet computer, a desktop computer, a handheld computer, a gaming device, a wearable communication device (e.g., a smart wristwatch, a pair of smart eyeglasses, etc.), or a similar type of device. In some implementations, user device 210 may receive information from and/or transmit information to embedding platform 220.

Embedding platform 220 includes one or more devices that generate a machine learning model for objects based on augmenting the objects with physical properties. In some implementations, embedding platform 220 may be designed to be modular such that certain software components may be swapped in or out depending on a particular need. As such, embedding platform 220 may be easily and/or quickly reconfigured for different uses. In some implementations, embedding platform 220 may receive information from and/or transmit information to one or more user devices 210.

In some implementations, as shown, embedding platform 220 may be hosted in a cloud computing environment 222. Notably, while implementations described herein describe embedding platform 220 as being hosted in cloud computing environment 222, in some implementations, embedding platform 220 may not be cloud-based (i.e., may be implemented outside of a cloud computing environment) or may be partially cloud-based.

Cloud computing environment 222 includes an environment that hosts embedding platform 220. Cloud computing environment 222 may provide computation, software, data access, storage, etc. services that do not require end-user knowledge of a physical location and configuration of system(s) and/or device(s) that hosts embedding platform 220. As shown, cloud computing environment 222 may include a group of computing resources 224 (referred to collectively as "computing resources 224" and individually as "computing resource 224").

Computing resource 224 includes one or more personal computers, workstation computers, server devices, or other types of computation and/or communication devices. In some implementations, computing resource 224 may host embedding platform 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, and/or the like.

Application 224-1 includes one or more software applications that may be provided to or accessed by user device 210. Application 224-1 may eliminate a need to install and execute the software applications on user device 210. For example, application 224-1 may include software associated with embedding platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program, and may support a single process. In some implementations, virtual machine 224-2 may execute on behalf of a user (e.g., a user of user device 210 or an operator of embedding platform 220), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems, and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
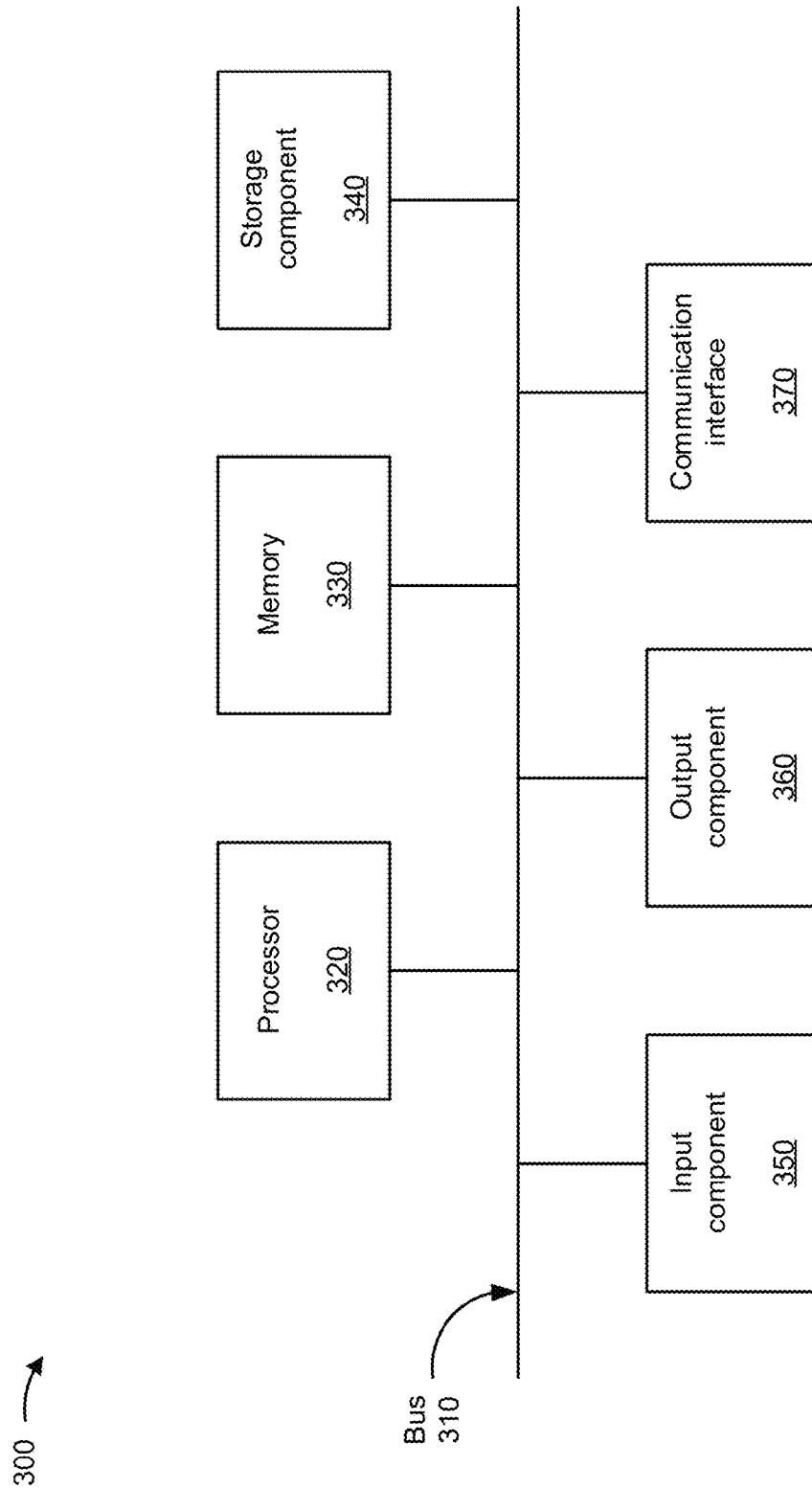
FIG. 3 is a diagram of example components of one or more devices of FIG. 2.

FIG. 3 is a diagram of example components of a device 300. Device 300 may correspond to user device 210, embedding platform 220, and/or computing resource 224. In some implementations, user device 210, embedding platform 220, and/or computing resource 224 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a wireless local area network interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
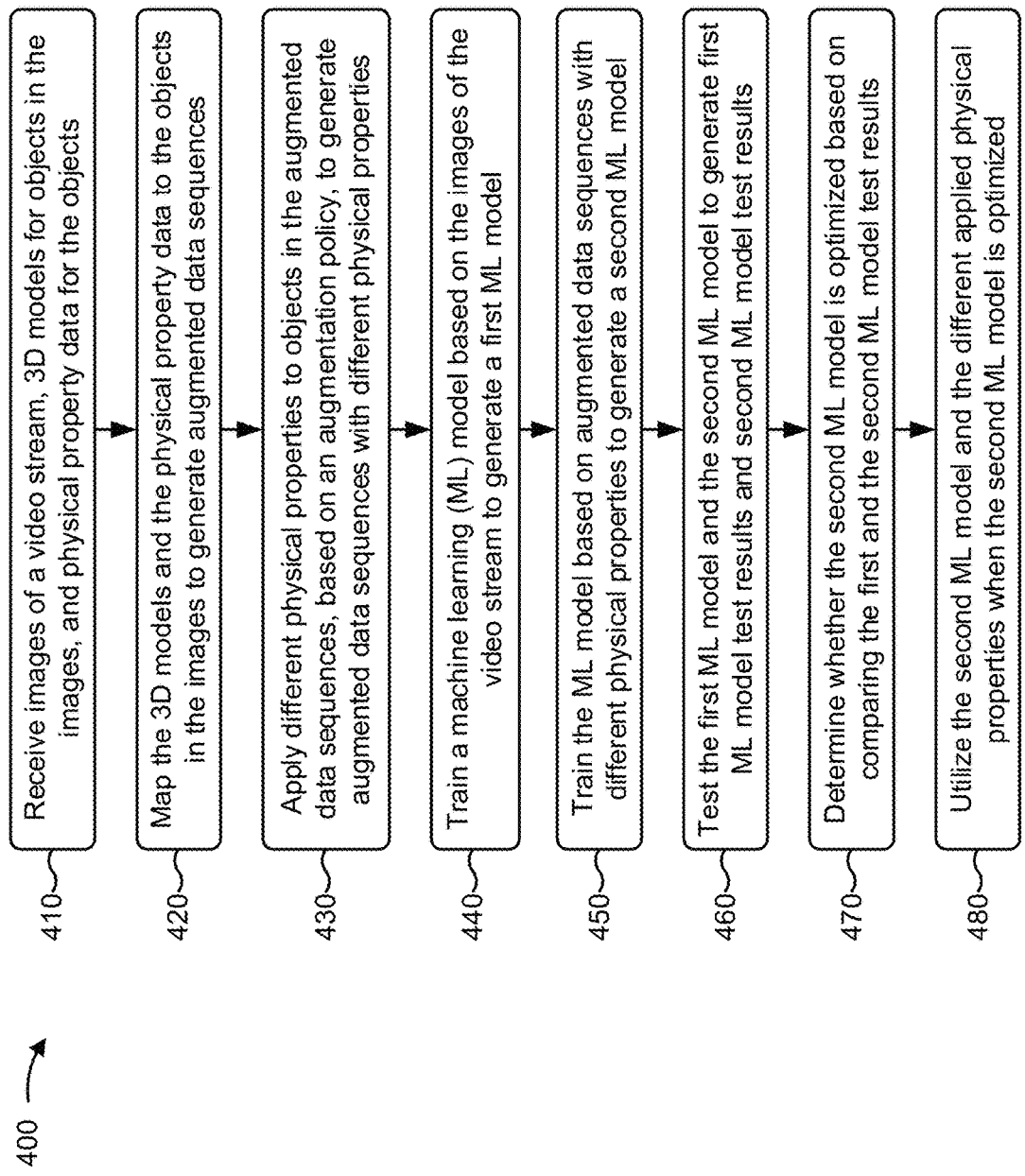
FIG. 4 is a flow chart of an example process for generating a machine learning model for objects based on augmenting the objects with physical properties.

FIG. 4 is a flow chart of an example process 400 for generating a machine learning model for objects based on augmenting the objects with physical properties. In some implementations, one or more process blocks of FIG. 4 may be performed by embedding platform 220. In some implementations, one or more process blocks of FIG. 4 may be performed by another device or a group of devices separate from or including embedding platform 220, such as user device 210.

As shown in FIG. 4, process 400 may include receiving images of a video stream, 3D models for objects in the images, and physical property data for the objects (block 410). For example, embedding platform 220 (e.g., using computing resource 224, processor 320, communication interface 370, and/or the like) may receive images of a video stream, 3D models for objects in the images, and physical property data for the objects. In some implementations, a user of user device 210 (e.g., via a user interface provided to the user) may cause user device 210 to provide, to embedding platform 220, training data for a machine learning model (e.g., images from video streams, metadata describing the images, and/or the like), 3D models for objects in the images of the training data (e.g., names of the objects, coordinates for the objects, normal vectors for the objects, and/or the like), and physical property data for the objects in the images of the training data (e.g., names of the objects, deformation data for the objects, gravity data for the objects, rotation data for the objects, rendering data for the objects, and/or the like).

In some implementations, the training data may include video streams, video frames, images in the video streams, objects in the images, metadata describing the video streams, the video frames, the images in the video streams, and/or the objects in the images, and/or the like. In some implementations, the metadata may include data identifying the images of the video streams, the objects in the images, classes associated with the objects, boundary boxes for the images, coordinates associated with the objects in the images, names of the objects, and/or the like. In some implementations, the metadata may be provided in an extensible markup language (XML) file, a data file, a spreadsheet file, and/or the like.

In some implementations, the 3D models may include 3D models of objects that correspond to the objects in the images of the training data. In some implementations, each 3D model may include a 3D representation of an object, 3D coordinates associated with the object, normal vectors associated with the object, a name of the object, and/or the like. In some implementations, each 3D model may include an Autodesk (e.g., fbx) format, a wavefront object format (e.g., obj), a stereolithography (e.g., stl) format, and/or the like. In some implementations, the 3D models may be provided in a binary file, a data file, a non-text file, and/or the like.

In some implementations, the physical property data may include physical property data associated with the objects in the images of the training data. In some implementations, the physical property data may be provided in a simulation open framework architecture (SOFA) framework that provides real-time physical simulation for the objects. In some implementations, the physical property data may include data indicating names of the objects, mathematics associated with deformations of the objects, mathematics associated with gravities for the objects, mathematics associated with rotations of the objects, mathematics associated with renderings of the objects, mathematics associated with collisions of the objects, and/or the like.

In this way, embedding platform 220 may receive the images of the video stream, the 3D models for the objects in the images, and the physical property data for the objects.

As further shown in FIG. 4, process 400 may include mapping the 3D models and the physical property data to the objects in the images to generate augmented data sequences (block 420). For example, embedding platform 220 (e.g., using computing resource 224, processor 320, and/or the like) may map the 3D models and the physical property data to the objects in the images to generate augmented data sequences. In some implementations, embedding platform 220 may utilize a data mapping technique to map a 3D model, of the 3D models, to each object in the images of the training data. The data mapping technique may create data element mappings between two distinct data models (e.g., the 3D models and the objects). In some implementations the data mapping technique may include a data-driven mapping technique (e.g., simultaneously evaluating actual data values in two data sources using heuristics and statistics to automatically discover complex mappings between two datasets), a semantic mapping technique (e.g., that utilizes a metadata registry to look up data element synonyms), and/or the like.

In some implementations, embedding platform 220 may utilize a nonlinear data mapping technique, which utilizes neural networks, to map a 3D model, of the 3D models, to each corresponding object in the images of the training data. The nonlinear data mapping by neural networks may include representing nonlinear mappings by a neural network that is trained based on unsupervised techniques (e.g., vector quantization techniques, subspaces techniques, probability density functions, and/or the like), supervised techniques (e.g., learning vector quantization techniques, subspaces techniques, probability density functions, and/or the like), and/or the like.

In some implementations, embedding platform 220 may map physical property data to each object in the images of the training data. In some implementations, embedding platform 220 may utilize a data mapping technique to map physical property data to each object in the images of the training data, as described elsewhere herein. In some implementations, embedding platform 220 may utilize a nonlinear data mapping technique, which utilizes neural networks, to map physical property data to each object in the images of the training data, as described elsewhere herein.

In some implementations, each mapped object, 3D model, and physical property data may generate an augmented data sequence. In some implementations, embedding platform 220 may generate augmented data sequences for the images of the training data. In some implementations, each augmented data sequence may include an object, of an image, that is augmented with a mapped 3D model and mapped physical property data, information associated with the image, and/or the like.

In this way, embedding platform 220 may map the 3D models and the physical property data to the objects in the images to generate the augmented data sequences.

As further shown in FIG. 4, process 400 may include applying different physical properties, of the physical property data, to objects in the augmented data sequences, based on an augmentation policy, to generate augmented data sequences with different applied physical properties (block 430). For example, embedding platform 220 (e.g., using computing resource 224, processor 320, and/or the like) may apply different physical properties, of the physical property data, to objects in the augmented data sequences, based on an augmentation policy, to generate augmented data sequences with different applied physical properties. In some implementations, embedding platform 220 may apply different physical properties to objects in the augmented data sequences based on augmentation policy data associated with an augmentation policy.

In some implementations, the augmentation policy data may include policy driven physical properties that are to be applied to the objects in the augmented data sequences. In some implementations, the augmentation policy may include information indicating how physical properties are to be applied to each augmented data sequence. For example, if an object in an augmented data sequence is a bouncing ball, the augmentation policy may indicate a specific value (e.g., 60%, 70%, and/or the like) for deformation of the bouncing ball, a specific value (e.g., zero) for gravity associated with the bouncing ball, a specific value (e.g., 10%, 20%, and/or the like) for rotation of the bouncing ball, information associated with rendering of the bouncing ball (e.g., texture, lighting, color, and/or the like), information associated with a collision of the bouncing ball (e.g., explode, collapse, rebound, and/or the like), and/or the like.

In some implementations, the augmentation policy may be configurable by an operator of embedding platform 220. In some implementations, the augmentation policy may cause embedding platform 220 to align the different physical properties with the objects in the augmented data sequences. In some implementations, the augmentation policy may apply physical properties, which are based on each object, to each object in the augmented data sequences. For example, the augmentation policy may cause embedding platform 220 to apply first physical properties to a first object (e.g., a hot air balloon), and second physical properties, that are different than the first physical properties, to a second object (e.g., a bouncing ball). In some implementations, applying the different physical properties to the objects in the augmented data sequences may generate augmented data sequences with different physical properties applied to the objects.

In this way, embedding platform 220 may apply the different physical properties, of the physical property data, to the objects in the augmented data sequences, based on the augmentation policy, to generate the augmented data sequences with the different applied physical properties.

As further shown in FIG. 4, process 400 may include training a machine learning model based on the images of the video stream to generate a first machine learning model (block 440). For example, embedding platform 220 (e.g., using computing resource 224, processor 320, and/or the like) may train a machine learning model based on the images of the video stream to generate a first machine learning model. In some implementations, embedding platform 220 may train a machine learning model with the training data to generate the first machine learning model (e.g., a first trained machine learning model). In some implementations, the first machine learning model may include an object detection deep learning model, such as a R-CNN model, a fast R-CNN model, a faster R-CNN model, a R-FCN model, a SSD model, and/or the like.

In some implementations, a R-CNN model may include an object detection deep learning model that scans an input image for possible objects using a selective search algorithm to generate a number of region proposals (e.g., 2000 region proposals). The R-CNN model applies a convolutional neural network (CNN) to each of the region proposals to produce an output for each CNN that extracts features from each image region, and feeds the output of each CNN into a support vector machine (SVM) and a linear regressor in order to classify each region based on the extracted features.

In some implementations, a fast R-CNN model may include an object detection deep learning model based on an R-CNN model that improves on a detection speed of the R-CNN model. The R-CNN model improves on the detection speed by performing feature extraction over the entire original image before proposing regions, thus only applying one CNN to the entire image instead of to a number of CNNs over a corresponding number of overlapping regions. The R-CNN model applies the output of the one CNN to a single layer that outputs class probabilities, thus extending the neural network for predictions instead of creating a new model.

In some implementations, a faster R-CNN model may include an object detection deep learning model that improves on the fast R-CNN model by employing a region proposal network (RPN) instead of a selective search algorithm to generate region proposals. In the faster R-CNN model, at the last layer of an initial CNN, a sliding window moves across a feature map and maps to a lower dimension. For each sliding-window location, the RPN generates multiple possible regions based on fixed-ratio anchor boxes (e.g., default bounding boxes). Each region proposal consists of an objectness score for the region (e.g., representing a likelihood that the region contains an object) and coordinates representing the bounding box of the region. If the objectness score satisfies a threshold, the coordinates are passed forward as a region proposal.

In some implementations, a R-FCN model may include an object detection deep learning model that applies position-sensitive score maps to a fully convolutional network. Each position-sensitive score map represents one relative position of one object class (e.g., an upper right portion of a particular type of object). The R-FCN model applies a CNN to an input image, adds a fully convolutional layer to generate a score bank of position sensitive score maps, and applies a RPN to generate regions of interest. The R-FCN model then divides each region of interest into sub-regions and applies the score bank to determine whether the sub-region matches a corresponding portion of an object, and classifies the region of interest based on, for example, whether the matches satisfy a threshold.

In some implementations, a single-shot detector (SSD) model may include an object detection deep learning model that performs region proposal and region classification in a single shot by simultaneously predicting the bounding box and the class as it processes an image, as opposed to performing region proposal and region classification in separate steps. Given an input image and a set of ground truth labels, the SSD model passes the image through a series of convolutional layers, yielding several sets of feature maps at different scales. For each location in each of these feature maps, the SSD model applies a convolutional filter to evaluate a small set of default bounding boxes. For each box, the SSD model simultaneously predicts the bounding box offset and the class probabilities. During training, the SSD model matches a ground truth box with the predicted boxes based on an intersection over union (IoU) evaluation metric, and labels the best predicted box a positive, along with other boxes that have an IoU that satisfies a threshold.

In this way, embedding platform 220 may train the machine learning model based on the images of the video stream to generate the first machine learning model.

As further shown in FIG. 4, process 400 may include training the machine learning model based on the augmented data sequences with the different applied properties to generate a second machine learning model (block 450). For example, embedding platform 220 (e.g., using computing resource 224, processor 320, and/or the like) may train the machine learning model based on the augmented data sequences with the different applied physical properties to generate a second machine learning model. In some implementations, embedding platform 220 may train the machine learning model, with the augmented data sequences with the different physical properties applied to the objects, to generate the second machine learning model (e.g., a second trained machine learning model). In some implementations, the second machine learning model may include an object detection deep learning model, such as a SSD model, a R-FCN model, a R-CNN model, a fast R-CNN model, a faster R-CNN model, and/or the like, as described elsewhere herein.

In this way, embedding platform 220 may train the machine learning model based on the augmented data sequences with the different applied properties to generate the second machine learning model.

As further shown in FIG. 4, process 400 may include testing the first machine learning model to generate first machine learning model test results and testing the second machine learning model to generate second machine learning model test results (block 460). For example, embedding platform 220 (e.g., using computing resource 224, processor 320, and/or the like) may test the first machine learning model to generate first machine learning model test results and may test the second machine learning model to generate second machine learning model test results. In some implementations, embedding platform 220 may test the first machine learning model by receiving predictions (e.g., indicating what objects are provided in the training data) based on providing the training data to the machine learning model, and comparing the predictions to the known objects in the training data. In some implementations, the first machine learning model test results may provide an indication of whether the predictions are correct (e.g., may provide an indication of an accuracy, a precision, and/or a recall of the first machine learning model). For example, the first machine learning model test results may indicate that the first machine learning model correctly predicted the known objects in the training data by a first particular amount (e.g., 80% correctly predicted, 90% correctly predicted, and/or the like).

In some implementations, embedding platform 220 may test the second machine learning model by receiving predictions (e.g., indicating what objects are provided in the augmented data sequences with the different physical properties applied to the objects) based on providing the augmented data sequences, with the different physical properties applied to the objects, to the machine learning model, and comparing the predictions to the known objects in the augmented data sequences with the different physical properties applied to the objects. In some implementations, the second machine learning model test results may provide an indication of whether the predictions are correct (e.g., may provide an indication of an accuracy, a precision, and/or a recall of the second machine learning model). For example, the second machine learning model test results may indicate that the second machine learning model correctly predicted the known objects in the augmented data sequences with the different physical properties applied to the objects by a second particular amount (e.g., 60% correctly predicted, 70% correctly predicted, and/or the like).

In this way, embedding platform 220 may test the first machine learning model to generate the first machine learning model test results and may test the second machine learning model to generate the second machine learning model test results.

As further shown in FIG. 4, process 400 may include determining whether the second machine learning model is optimized based on comparing the first machine learning model test results and the second machine learning model test results (block 470). For example, embedding platform 220 (e.g., using computing resource 224, processor 320, and/or the like) may determine whether the second machine learning model is optimized based on comparing the first machine learning model test results and the second machine learning model test results. In some implementations, embedding platform 220 may compare the first machine learning model test results and the second machine learning model test results, and may determine whether the second machine learning model is optimized based on comparing the first machine learning model test results and the second machine learning model test results. In some implementations, embedding platform 220 may determine that the second machine learning model is optimized when the second machine learning model test results are within a predetermined threshold of the first machine learning model test results.

For example, assume that the first machine learning model test results indicate that that the first machine learning model correctly predicted the known objects in the training data 95% of the time, and that the second machine learning model test results indicate that that the second machine learning model correctly predicted the known objects in the augmented data sequences, with the different physical properties applied to the objects, 75% of the time. Further assume that the predetermined threshold is 10%. In such an example, embedding platform 220 may determine that the second machine learning model is not optimized since the second machine learning model test results (e.g., 75%) are not within the predetermined threshold (e.g., 10%) of the first machine learning model test results (e.g., 95%).

In some implementations, if embedding platform 220 determines that the second machine learning model is optimized, embedding platform 220 may output the second machine learning model and the different physical properties applied to the objects. In some implementations, embedding platform 220 may store the second machine learning model and the different physical properties applied to the objects in a memory associated with embedding platform 220. In some implementations, embedding platform 220 may provide the second machine learning model and the different physical properties applied to the objects to user device 210 or to another device.

In some implementations, if embedding platform 220 determines that the second machine learning model is not optimized, embedding platform 220 may modify the different physical properties applied to the objects, and may retrain and retest the second machine learning model based on the modified different physical properties applied to the objects. In some implementations, embedding platform 220 may iteratively modify the different physical properties applied to the objects, and may retrain and retest the second machine learning model until the second machine learning model is optimized. In such implementations, embedding platform 220 may further modify the different physical properties applied to the objects and, thus, improve the performance of the second machine learning model.

In some implementations, embedding platform 220 may modify the augmentation policy in order to modify the different physical properties applied to the objects. In some implementations, embedding platform 220 may utilize a hyperparameter optimization technique to modify the augmentation policy, such as a grid search technique, a random search technique, a Bayesian optimization technique, a gradient-based optimization technique, an evolutionary optimization technique, and/or the like.

A grid search technique may include a hyperparameter optimization technique that performs an exhaustive searching through a manually specified subset of the hyperparameter space of a learning algorithm. A grid search algorithm is guided by some performance metric, typically measured by cross-validation on a training set or evaluation on a held-out validation set. Because the parameter space of a machine learning model may include real-valued or unbounded value spaces for certain parameters, manually set bounds and discretization may be applied before applying the grid search technique.

A random search technique may include a hyperparameter optimization technique that samples parameter settings a fixed number of times instead of performing an exhaustive searching such as is performed by a grid search technique. The random search technique has been found to be more effective in high-dimensional spaces than an exhaustive search, as some hyperparameters often do not significantly affect the loss. Therefore, having randomly dispersed data provides more textured data than an exhaustive search over parameters that do not affect the loss.

A Bayesian optimization technique may include a hyperparameter optimization technique that provides global optimization of noisy black-box functions. Applied to hyperparameter optimization, Bayesian optimization includes developing a statistical model of a function from hyperparameter values to an objective evaluated on a validation set. The Bayesian optimization technique assumes that there is some smooth but noisy function that acts as a mapping from hyperparameters to the objective. Bayesian optimization relies on assuming a general prior probability distribution over functions which, when combined with observed hyperparameter values and corresponding outputs, yields a distribution over functions. The Bayesian optimization technique iteratively selects hyperparameters to observe (e.g., experiments to run) in a manner that adjusts according to exploration (e.g., hyperparameters for which an outcome is most uncertain) and exploitation (e.g., hyperparameters which are expected to have a good outcome).

A gradient-based optimization technique may include a hyperparameter optimization technique that computes a gradient with respect to hyperparameters and then optimizes the hyperparameters using gradient descent. Although the first usage of gradient-based optimization techniques was focused on neural networks, gradient-based optimization techniques have been extended to other models, such as support vector machines and logistic regression. An alternative approach to obtain a gradient with respect to hyperparameters may include differentiating the steps of an iterative optimization algorithm using automatic differentiation.

An evolutionary optimization technique may include a hyperparameter optimization technique that provides for global optimization of noisy black-box functions. Evolutionary optimization uses evolutionary algorithms to search a space of hyperparameters for a given algorithm. Evolutionary optimization follows a process inspired by the biological concept of evolution. For example, this process may include creating an initial population of random solutions (e.g., randomly generating tuples of hyperparameters), evaluating the hyperparameter tuples and acquiring a fitness function, ranking the hyperparameter tuples by relative fitness, replacing worst-performing hyperparameter tuples with new hyperparameter tuples generated through crossover and mutation, and continuing the evaluation, ranking, and replacing until satisfactory algorithm performance is reached or algorithm performance is no longer improving.

In this way, embedding platform 220 may determine whether the second machine learning model is optimized based on comparing the first machine learning model test results and the second machine learning model test results.

As further shown in FIG. 4, process 400 may include utilizing the second machine learning model and the different applied physical properties when the second machine learning model is optimized (block 480). For example, embedding platform 220 (e.g., using computing resource 224, processor 320, and/or the like) may utilize the second machine learning model and the different applied physical properties when the second machine learning model is optimized. In some implementations, the user of user device 210 may cause user device 210 to provide, to embedding platform 220, an unknown object in an image from a video stream. In some implementations, embedding platform 220 may receive the unknown object, and may utilize the second machine learning model, and the different physical properties applied to the objects, to predict the unknown object. In some implementations, embedding platform 220 may provide, to user device 210, information indicating the prediction of the unknown object, and user device 210 may display the information indicating the prediction of the unknown object to the user of user device 210 (e.g., via a user interface).

In some implementations, embedding platform 220 may utilize the second machine learning model to identify unknown objects in images, videos, video frames, and/or the like. In some implementations, embedding platform 220 may utilize the second machine learning model to create a searchable index of images, videos, video frames, objects in images, videos, and/or video frames, and/or the like. In some implementations, embedding platform 220 may utilize the second machine learning model to real time object recognition (e.g., of people, things, and/or the like) in images, videos, video frames, and/or the like.

In this way, embedding platform 220 may utilize the second machine learning model and the different applied physical properties when the second machine learning model is optimized.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Some implementations described herein provide an embedding platform that generates a machine learning model for objects based on augmenting the objects with physical properties. For example, the embedding platform may receive images of a video stream, 3D models for objects in the images, and physical property data for the objects, and may map the 3D models and the physical property data to the objects to generate augmented data sequences. The embedding platform may apply different physical properties, of the physical property data, to the objects in the augmented data sequences, based on an augmentation policy, to generate augmented data sequences with different applied physical properties. The embedding platform may train a machine learning model based on the images of the video stream to generate a first machine learning model, and may train the machine learning model based on the augmented data sequences with the different applied physical properties to generate a second machine learning model. The embedding platform may test the first machine learning model to generate first machine learning model test results, and may test the second machine learning model to generate second machine learning model test results. The embedding platform may determine whether the second machine learning model is optimized based on comparing the first machine learning model test results and the second machine learning model test results. The embedding platform may utilize the second machine learning model and the different applied physical properties when the second machine learning model is optimized.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Certain user interfaces have been described herein and/or shown in the figures. A user interface may include a graphical user interface, a non-graphical user interface, a text-based user interface, or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
    one or more memories; and
    one or more processors, communicatively coupled to the one or more memories, to:
        receive images of a video stream, three-dimensional models for objects in the images, and physical property data for the objects;
        map the three-dimensional models and the physical property data to the objects in the images to generate augmented data sequences with the objects;
        apply different physical properties, of the physical property data, to the objects in the augmented data sequences, based on an augmentation policy, to generate augmented data sequences with different applied physical properties;
        train a machine learning model based on the images of the video stream to generate a first trained machine learning model;
        train the machine learning model, based on the augmented data sequences with the different applied physical properties, to generate a second trained machine learning model;
        compare the first trained machine learning model and the second trained machine learning model;
        determine whether the second trained machine learning model is optimized based on a result of comparing the first trained machine learning model and the second trained machine learning model; and
        provide the second trained machine learning model and the different applied physical properties when the second trained machine learning model is optimized.

2. The device of claim 1, wherein the one or more processors are further to:
    modify the different applied physical properties when the second trained machine learning model is not optimized;
    retrain the machine learning model, based on the modified different applied physical properties, to generate the second trained machine learning model; and
    repeat the modifying the different applied physical properties and the retraining until the second trained machine learning model is optimized.

3. The device of claim 1, wherein the one or more processors are further to:
    utilize the second trained machine learning model and the different applied physical properties, when the second trained machine learning model is optimized, to predict an unknown object.

4. The device of claim 1, wherein the one or more processors are further to:
    receive the machine learning model and the augmentation policy,
        wherein the augmentation policy includes information indicating how the different physical properties are to be applied to each of the augmented data sequences.

5. The device of claim 1, wherein the machine learning model includes one or more of:
    a single shot multibox detector (SSD) model,
    a region-based fully convolutional network (R-FCN) model,
    a region-based convolution network (R-CNN) model,
    a fast R-CNN model, or
    a faster R-CNN model.

6. The device of claim 1, wherein the one or more processors are further to:
    modify the different applied physical properties, when the second trained machine learning model is not optimized, based on a hyperparameter optimization technique,
        wherein the hyperparameter optimization technique includes one or more of:
            a grid search technique,
            a random search technique,
            a Bayesian optimization technique,
            a gradient-based optimization technique, or
            an evolutionary optimization technique.

7. The device of claim 1, wherein, the one or more processors are further to:
    test the first trained machine learning model to generate first test results;
    test the second trained machine learning model to generate second test results;
    compare the first test results and the second test results; and
    determine whether the second trained machine learning model is optimized based on a result of comparing the first test results and the second test results.

8. A non-transitory computer-readable medium storing instructions, the instructions comprising:
    one or more instructions that, when executed by one or more processors, cause the one or more processors to:
        receive images of a video stream, three-dimensional models for objects in the images, and physical property data for the objects,
            the images of the video stream including metadata that identifies at least two of:
                the images of the video stream,
                the objects in the images,
                classes associated with the objects,
                boundary boxes for the images,
                coordinates associated with the objects in the images, or names of the objects,
the three-dimensional models including at least two of:
three-dimensional representations of the objects,
three-dimensional coordinates associated with the objects,
normal vectors associated with the objects, or
the names of the objects,
the physical property data including at least two of:
the names of the objects,
information associated with deformations of the objects,
information associated with gravities for the objects,
information associated with rotations of the objects,
information associated with renderings of the objects, or
information associated with collisions of the objects;
map the three-dimensional models and the physical property data to the objects in the images to generate augmented data sequences with the objects;
apply different physical properties, of the physical property data, to the objects in the augmented data sequences to generate augmented data sequences with different applied physical properties;
train a machine learning model based on the images of the video stream to generate a first machine learning model;
train the machine learning model, based on the augmented data sequences with the different applied physical properties, to generate a second machine learning model;
test the first machine learning model and the second machine learning model to generate first test results and second test results, respectively;
determine whether the second machine learning model is optimized based on comparing the first test results and the second test results; and
utilize the second machine learning model and the different applied physical properties, when the second machine learning model is optimized, to make a prediction.

9. The non-transitory computer-readable medium of claim 8, wherein the instructions further comprise:
one or more instructions that, when executed by the one or more processors, cause the one or more processors to:
provide the second machine learning model and the different applied physical properties when the second machine learning model is optimized.

10. The non-transitory computer-readable medium of claim 8, wherein the instructions further comprise:
one or more instructions that, when executed by the one or more processors, cause the one or more processors to:
modify the different applied physical properties when the second machine learning model is not optimized;
retrain the machine learning model, based on the modified different applied physical properties, to generate the second machine learning model;
retest the second machine learning model to generate the second test results; and
repeat the modifying the different applied physical properties, the retraining, and the retesting until the second machine learning model is optimized.

11. The non-transitory computer-readable medium of claim 8, wherein the different applied physical properties are configurable.

12. The non-transitory computer-readable medium of claim 8, wherein each of the first machine learning model and second machine learning model includes one or more of:
a single shot multibox detector (SSD) model,
a region-based fully convolutional network (R-FCN) model,
a region-based convolution network (R-CNN) model,
a fast R-CNN model, or
a faster R-CNN model.

13. The non-transitory computer-readable medium of claim 8, wherein the instructions further comprise:
one or more instructions that, when executed by the one or more processors, cause the one or more processors to:
modify the different applied physical properties, when the second machine learning model is not optimized, based on one or more of:
a grid search technique,
a random search technique,
a Bayesian optimization technique,
a gradient-based optimization technique, or
an evolutionary optimization technique.

14. The non-transitory computer-readable medium of claim 8, wherein the instructions further comprise:
one or more instructions that, when executed by the one or more processors, cause the one or more processors to:
determine that the second machine learning model is optimized when the second test results are within a predetermined threshold of the first test results.

15. A method, comprising:
receiving, by a device, images of a video stream, three-dimensional models for objects in the images, and physical property data for the objects;
associating, by the device, the three-dimensional models and the physical property data with the objects in the images to generate augmented data sequences with the objects;
receiving, by the device, an augmentation policy;
applying, by the device and based on an augmentation policy, different physical properties, of the physical property data, to the objects in the augmented data sequences in order to generate augmented data sequences with different applied physical properties;
training, by the device, a machine learning model based on the images of the video stream to generate a first trained machine learning model;
training, by the device, the machine learning model, based on the augmented data sequences with the different applied physical properties, to generate a second trained machine learning model;
testing, by the device, the first trained machine learning model and the second trained machine learning model to generate first test results and second test results, respectively;
determining, by the device, whether the second trained machine learning model is optimized based on whether the second test results are within a predetermined threshold of the first test results; and
providing, by the device, the second trained machine learning model and the different applied physical properties when the second trained machine learning model is optimized.

16. The method of claim 15, further comprising:
receiving an unknown image with an unknown object; and
utilizing the second trained machine learning model and the different applied physical properties, when the second trained machine learning model is optimized, to identify the unknown object.

17. The method of claim 15, further comprising:
modifying the different applied physical properties when the second trained machine learning model is not optimized;
retraining the machine learning model, based on the modified different applied physical properties, to generate an updated second trained machine learning model;
retesting the updated second trained machine learning model to generate updated second test results; and
repeating the modifying the different applied physical properties, the retraining, and the retesting until the second trained machine learning model is optimized.

18. The method of claim 15, wherein the augmentation policy includes configurable information indicating how the different physical properties are to be applied to each of the augmented data sequences.

19. The method of claim 15, wherein the machine learning model includes an object detection deep learning model.

20. The method of claim 15, further comprising:
modifying the different applied physical properties, when the second trained machine learning model is not optimized, based on a hyperparameter optimization technique.

* * * * *